Patented July 28, 1925.

1,547,809

UNITED STATES PATENT OFFICE.

GEORGE C. HALE AND FREDRICH OLSEN, OF DOVER, NEW JERSEY.

PROCESS FOR PREPARING PROPELLENT POWDERS.

No Drawing. Application filed November 6, 1923. Serial No. 673,127.

(GRANTED UNDER THE ACT OF MARCH 3, 1883; 22 STAT. L. 625.)

*To all whom it may concern:*

Be it known that we, GEORGE C. HALE and FREDRICH OLSEN, citizens of the United States, and residents of Dover, in the county of Morris and State of New Jersey, have invented an Improvement in Processes for Preparing Propellent Powders, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a process for preparing propellent powders.

The primary object of our invention is the establishment of a method for incorporating pentaerythritetranitrate, nitroguanidine and other crystalline materials into nitrocellulose powders.

With the foregoing and other objects in view, our invention resides in the novel combination of ingredients and in the details of preparation hereinafter described and claimed, it being understood that changes in the precise embodiment of the invention herein disclosed may be made within the scope of what is claimed without departing from the spirit of the invention.

Pentaerythritetranitrate and nitroguanidine have many properties which indicate their suitability for use as propellent powders. For example, both are stable compounds, are nonhygroscopic, are easily ignited and burn quickly without leaving an appreciable residue. These materials, however, are crystalline compounds which cannot be colloided by any known solvent to produce propellants similar to colloided nitrocellulose. They are soluble, however, in certain organic compounds which serve as colloiding agents for nitrocellulose.

It is the purpose of our invention to use those materials which serve as solvents for nitroguanidine, pentaerythritetranitrate and like crystalline compounds and which at the same time may be employed as colloiding agents for nitrocellulose as a means for carrying pentaerythritetranitrate or other suitable crystalline compounds into a nitrocellulose colloid.

Experiments have been conducted with a number of organic materials which serve as solvents for the crystalline compounds recited and which also serve as colloiding agents for nitrocellulose. Thus, for example, paratolylmethylketone, benzaldehdye, diacetin, urethane, etc., may be employed to produce, when pentaerythritetranitrate, nitroguanidine, or other similar crystalline compounds are mixed with nitrocellulose, propellants which will have properties similar to colloided nitrocellulose. Such mixtures have been found to give very desirable results in practice and at the same time the mixture of the nonhygroscopic crystalline material with the ordinary hygroscopic nitrocellulose will almost entirely obviate any danger of deterioration of the propellant thus prepared, due to moisture or dampness.

It is the object of our invention, then, to carry crystalline compounds as pentaerythritetranitrate, and nitroguanidine into a nitrocellulose colloid by employing materials which serve both as solvents for the crystalline compounds and as a colloiding agent for the nitrocellulose.

We claim:

1. A method of incorporating pentaerythritetranitrate into a nitrocellulose powder which includes treating the pentaerythritetranitrate with an alcohol derivative which serves both as a solvent for the pentaerythritetranitrate and as a colloiding agent for the nitrocellulose.

2. A method of incorporating pentaerythritetranitrate into a nitrocellulose powder which includes treating the pentaerythritetranitrate with an organic compound which serves both as a solvent for the pentaerythritetranitrate and a colloiding agent for the nitrocellulose.

3. A method of incorporating pentaerythritetranitrate into a nitrocellulose powder which includes treating the pentaerythritetranitrate with a solvent which serves as a colloiding agent for the nitrocellulose.

4. A methor of incorporating a crystalline compound into a nitrocellulose powder which includes treating the crystalline compound with an organic material which serves both as a solvent for the crystalline compound and colloiding agent for the nitrocellulose.

5. A method of incorporating a crystalline compound into a nitrocellulose powder which includes treating the crystalline compound with a solvent which serves as a colloiding agent for the nitrocellulose.

6. A new propellant embodying pentaerythritetranitrate and nitrocellulose.

GEORGE C. HALE.
FREDRICH OLSEN.